United States Patent
Hemphill et al.

(10) Patent No.: US 10,529,260 B2
(45) Date of Patent: Jan. 7, 2020

(54) SYSTEM FOR MOUNTING A PLURALITY OF DISPLAY UNITS

(71) Applicant: CHRISTIE DIGITAL SYSTEMS USA, INC., Cypress, CA (US)

(72) Inventors: Bryan Russell Hemphill, Waterloo (CA); Daniel Robert Adema, Kitchener (CA); Paul Groh, Waterloo (CA); Maximilian Pfeifle, Waterloo (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 616 days.

(21) Appl. No.: 14/982,093

(22) Filed: Dec. 29, 2015

(65) Prior Publication Data
US 2017/0186345 A1  Jun. 29, 2017

(51) Int. Cl.
*G09F 9/30* (2006.01)
*F16B 1/00* (2006.01)
*F16M 13/02* (2006.01)
*F16M 11/04* (2006.01)

(52) U.S. Cl.
CPC .................. *G09F 9/30* (2013.01); *F16B 1/00* (2013.01); *F16M 11/048* (2013.01); *F16M 13/022* (2013.01); *F16B 2001/0035* (2013.01)

(58) Field of Classification Search
CPC ...... F16M 11/048; F16M 13/022; G09F 9/30; G09F 9/3026; F16B 1/00; F16B 2001/0035
USPC .... 248/917–919, 489, 496, 466, 475.1, 476, 248/477, 317; 345/33, 55, 108; 211/26.2, 87.01, 26; 348/383; 349/58; 313/581; 439/374
See application file for complete search history.

(56) References Cited

U.S. PATENT DOCUMENTS

| | | | | |
|---|---|---|---|---|
| 3,730,612 A | * | 5/1973 | Arroyo | A45D 42/16 248/476 |
| 3,775,881 A | * | 12/1973 | Salam | G09F 9/375 345/111 |
| 3,822,848 A | * | 7/1974 | Hopkins | F16M 11/046 248/279.1 |
| 3,991,496 A | * | 11/1976 | Helwig | G09F 9/375 40/449 |

(Continued)

OTHER PUBLICATIONS http://www.humboldtmfg.com/rod_clamps.html; accessed Nov. 19, 2015.

(Continued)

*Primary Examiner* — Jonathan Liu
*Assistant Examiner* — Devin K Barnett
(74) *Attorney, Agent, or Firm* — Perry + Currier, Inc.

(57) ABSTRACT

According to the present specification there is provided a system for mounting a plurality of display units, which system comprises a display locating component that is substantially two-dimensional. The display locating component defines a surface having a profile, and the display locating component has a plurality of mounting positions each at a predetermined position on the display locating component, each mounting position configured to receive at least one of the display units. The system also comprises a plurality of adjustable mounts configured to: support the display locating component, and adjust the profile of the display locating component to within a given profile tolerance.

5 Claims, 14 Drawing Sheets

(56) References Cited

U.S. PATENT DOCUMENTS

| | | | |
|---|---|---|---|
| 4,074,883 A * | 2/1978 | Daly | F16M 13/02 248/201 |
| 4,667,914 A * | 5/1987 | Bailey | G09F 7/20 160/38 |
| 4,819,357 A * | 4/1989 | Salam | G09F 9/375 340/815.62 |
| 4,856,888 A * | 8/1989 | Wahl | G02B 7/1824 359/881 |
| 5,299,017 A * | 3/1994 | Furuno | H04N 9/3147 248/918 |
| 5,323,575 A * | 6/1994 | Yeh | E04F 21/1844 52/177 |
| 5,475,939 A * | 12/1995 | Salam | G09F 9/375 345/111 |
| 5,537,127 A * | 7/1996 | Jingu | A47B 21/00 248/921 |
| 6,314,669 B1 * | 11/2001 | Tucker | G09F 9/33 340/815.45 |
| 6,320,566 B1 * | 11/2001 | Go | G09G 3/3614 345/100 |
| 6,554,238 B1 * | 4/2003 | Hibberd | A47B 81/061 248/278.1 |
| 6,989,800 B2 * | 1/2006 | McLaughlin | G09F 9/30 345/1.1 |
| 7,161,296 B2 * | 1/2007 | Kim | H05K 7/20 313/581 |
| 7,317,613 B2 * | 1/2008 | Quijano | F16M 11/041 16/323 |
| 7,457,120 B2 * | 11/2008 | Bae | H05K 7/20963 361/704 |
| 7,568,400 B2 * | 8/2009 | Tokumoto | G01L 5/221 73/862.333 |
| 7,580,248 B2 * | 8/2009 | Ogawa | H04N 5/64 248/917 |
| 7,621,500 B2 * | 11/2009 | Ishizaki | F16C 11/0661 248/371 |
| 7,663,868 B1 * | 2/2010 | Lam | H05K 5/0204 248/324 |
| 7,694,444 B2 * | 4/2010 | Miller | H05K 7/183 40/446 |
| 7,738,245 B1 * | 6/2010 | Stifal | F16M 11/10 248/917 |
| 7,768,775 B2 * | 8/2010 | Kim | H05K 5/02 248/284.1 |
| 7,779,568 B2 * | 8/2010 | Gettelfinger | G09F 9/33 248/218.4 |
| 7,793,907 B2 * | 9/2010 | Woodward | F16G 13/16 248/317 |
| 7,823,308 B1 * | 11/2010 | Munson | H05K 7/183 345/1.1 |
| 7,880,687 B2 * | 2/2011 | Kondo | G09F 15/00 345/1.1 |
| 7,984,888 B2 * | 7/2011 | Park | F16M 11/10 248/274.1 |
| 7,997,550 B2 * | 8/2011 | Kuhn | F16M 11/10 248/276.1 |
| 8,094,438 B2 * | 1/2012 | Dittmer | F16M 11/10 248/125.7 |
| 8,154,885 B2 * | 4/2012 | Anderson | F16M 13/02 248/917 |
| 8,313,072 B2 * | 11/2012 | Bakkom | E05D 3/12 248/282.1 |
| RE43,921 E * | 1/2013 | Smed | F16M 11/10 248/124.1 |
| 8,348,212 B2 * | 1/2013 | O'Keene | F16M 13/02 248/222.14 |
| 8,362,696 B2 * | 1/2013 | Zheng | G09F 27/008 313/512 |
| 8,369,103 B2 * | 2/2013 | Mitsuhashi | F16M 13/02 248/917 |
| 8,441,801 B2 * | 5/2013 | Kelly | H05K 5/0017 361/753 |
| 8,456,808 B2 * | 6/2013 | Grey | F16M 11/10 248/201 |
| 8,472,191 B2 * | 6/2013 | Yamamoto | H05K 7/20963 165/104.33 |
| 8,542,499 B2 * | 9/2013 | Skull | B32B 27/08 361/825 |
| 8,641,202 B2 * | 2/2014 | Okada | G03B 21/26 349/161 |
| 8,693,172 B2 * | 4/2014 | Russell | F16M 11/10 248/921 |
| 8,702,048 B2 * | 4/2014 | Kludt | F16B 2/12 248/223.41 |
| 8,761,468 B2 * | 6/2014 | Mizutani | G06F 19/321 382/128 |
| 8,944,393 B2 * | 2/2015 | Mitsuhashi | G09F 7/18 248/220.22 |
| 9,372,659 B2 * | 6/2016 | Hall | G06F 3/1446 |
| 9,416,551 B2 * | 8/2016 | Hall | G09F 21/04 |
| 9,642,272 B1 * | 5/2017 | Hall | G06F 3/1446 |
| 9,836,999 B2 * | 12/2017 | Nall | G09F 13/04 |
| 2002/0095813 A1 * | 7/2002 | Tatarnic | G01C 9/28 33/613 |
| 2003/0075653 A1 * | 4/2003 | Li | F16M 11/10 248/274.1 |
| 2003/0217495 A1 * | 11/2003 | Nagamine | G09F 9/00 40/605 |
| 2004/0008155 A1 * | 1/2004 | Cok | G06F 3/1446 345/1.3 |
| 2004/0035987 A1 * | 2/2004 | Oddsen, Jr. | A47B 49/00 248/121 |
| 2004/0090391 A1 * | 5/2004 | Kondo | H04N 9/12 345/1.1 |
| 2004/0104871 A1 * | 6/2004 | Boldt, Jr. | G02F 1/133504 345/82 |
| 2004/0195471 A1 * | 10/2004 | Sachen, Jr. | F16M 11/10 248/127 |
| 2006/0238967 A1 * | 10/2006 | Carson | B60R 11/0235 361/679.04 |
| 2006/0256035 A1 * | 11/2006 | Kondo | G06F 3/1446 345/1.1 |
| 2007/0170336 A1 * | 7/2007 | Li | B60R 11/0235 248/324 |
| 2007/0205340 A1 * | 9/2007 | Jung | F16M 11/24 248/125.9 |
| 2009/0002723 A1 * | 1/2009 | Kamiyama | G01B 11/002 356/625 |
| 2009/0021496 A1 * | 1/2009 | Silzars | G09F 13/22 345/204 |
| 2009/0073080 A1 * | 3/2009 | Meersman | G02F 1/13336 345/1.3 |
| 2009/0096711 A1 * | 4/2009 | Jang | G06F 3/1446 345/1.3 |
| 2010/0026973 A1 * | 2/2010 | Hemphill | G06F 1/1601 353/119 |
| 2010/0123732 A1 * | 5/2010 | Jenks | G06F 3/1446 345/592 |
| 2010/0142137 A1 * | 6/2010 | Kwak | F16M 11/048 361/679.05 |
| 2010/0200714 A1 * | 8/2010 | Persson | F16M 13/02 248/220.21 |
| 2010/0309185 A1 * | 12/2010 | Koester | G09G 3/32 345/211 |
| 2011/0205757 A1 * | 8/2011 | Whyte | F21S 2/005 362/607 |
| 2012/0218753 A1 * | 8/2012 | Joffer | G09F 9/33 362/235 |
| 2012/0236509 A1 * | 9/2012 | Cope | G02F 1/133305 361/730 |
| 2013/0269273 A1 * | 10/2013 | Mayo | E04F 13/0862 52/391 |
| 2014/0202099 A1 * | 7/2014 | Boyle | E04F 15/02044 52/386 |
| 2014/0346307 A1 * | 11/2014 | Tran | B60R 13/105 248/475.1 |
| 2014/0361954 A1 * | 12/2014 | Epstein | G06F 3/1454 345/2.3 |

(56) References Cited

U.S. PATENT DOCUMENTS

| | | | | |
|---|---|---|---|---|
| 2015/0015504 A1* | 1/2015 | Lee | .................... | G06F 3/04845 |
| | | | | 345/173 |
| 2015/0187241 A1* | 7/2015 | Hall | ........................ | G09F 21/04 |
| | | | | 29/428 |
| 2015/0251608 A1* | 9/2015 | DeGrazia | .............. | B60R 13/105 |
| | | | | 248/475.1 |
| 2015/0272351 A1* | 10/2015 | De Guzman | ............ | A47G 1/12 |
| | | | | 248/475.1 |
| 2015/0277182 A1* | 10/2015 | Koizumi | ................ | F16M 11/10 |
| | | | | 349/58 |
| 2015/0324164 A1* | 11/2015 | Kim | ...................... | G06F 3/1446 |
| | | | | 345/1.3 |
| 2016/0048047 A1* | 2/2016 | Pyo | ...................... | G02B 5/3041 |
| | | | | 349/12 |
| 2016/0132281 A1* | 5/2016 | Yamazaki | ............. | G06F 3/1446 |
| | | | | 345/1.3 |
| 2016/0326754 A1* | 11/2016 | Bucsa | ................. | E04F 21/0092 |
| 2017/0101787 A1* | 4/2017 | Boyle | ............... | E04F 15/02044 |

OTHER PUBLICATIONS http://www.cokerexpo.co.uk/Rodsystems.html; accessed Nov. 19, 2015.
http://www.aminimart.com/rig-accessories/rod-clamp/1-4-adjustable-screw-rod-clamp-railblock-fr-15mm-support-rail-system-dslr-rig.html?_store=french&_from_store=english; accessed Nov. 19, 2015.
http://www.ebay.com/itm/1-4-Screw-Rail-Block-Rod-Clamp-fr-15mm-rod-DSLR-Rig-Follow-Focus-Rail-System-/330691527479; accessed Nov. 19, 2015.
http://www.srita.com/web03/jsclamp/js01.html; accessed Nov. 19, 2015.
http://www.amazon.com/MSI-PRO-MSI-302F-Quick-Release-Toggle-Clamps/dp/B0000224BL; accessed Nov. 19, 2015.

* cited by examiner

SYSTEM FOR MOUNTING A PLURALITY OF DISPLAY UNITS

FIELD

The present specification relates to display units, and in particular to a system for mounting and aligning a plurality of display units within a tiled display system.

BACKGROUND

While advances in display technologies have made larger displays available, there remains a limit beyond which larger displays become increasingly technically challenging and expensive to fabricate. The same is true of displays with non-rectangular and/or irregular shapes. One solution to these challenges is to create a tiled display system where a number of smaller displays, sometimes referred to as display tiles, are placed side-by-side to cover a large area and/or an area of irregular shape.

Even though tiled display systems make it possible to provide a large overall display area, tiled display systems have their own installation and alignment challenges. Each display tile must be positioned precisely in relation to its neighboring tiles, as even small misalignments can be detected by the human eye. Due to these strict alignment requirements, installation of tiled display systems can be challenging and time-consuming.

Rigid frames for supporting and aligning large numbers of display tiles can become prohibitively large, heavy, and/or expensive for large-area tiled display systems. Existing supports for non-tiled, individual displays often provide multiple degrees of freedom in aligning each display; however, these individual supports necessitate aligning each display tile individually and often through multiple degrees of freedom. As such, using such individual display supports for a tiled display system installation can make the tiled display system installation and aligning process slow and cumbersome. For example, a process for mounting and aligning large numbers of display tiles can include mounting a first display tile using a dedicated support, connecting the first display tile to a display driving system, before mounting, aligning and connecting adjacent display tiles, each adjacent display tile aligned and connected directly after mounting and before mounting a next adjacent display tile. Such a process is slow, cumbersome.

SUMMARY

The present specification is directed to a system for mounting and aligning a plurality of display units within a tiled display system. The system includes a display locating component that is substantially two-dimensional, and which can be mounted to a load bearing structure using a plurality of adjustable mounts which both support the display locating component and which can adjust a profile of a surface of the display locating component. For example, the display locating component can comprise a metal sheet with a plurality of display mounting positions each mounting position configured to receive and support a respective display unit. The display locating component can be mounted to a surface using the adjustable mounts in the absence of display tiles, and the surface of the display locating component can be adjusted in the absence of display tiles. For example, the adjustable mounts can be used to adjust a flatness and/or a profile of the two dimensional display locating component such that when the display units are mounted thereto, respective viewing surfaces of the display units are already aligned.

Furthermore, each mounting position is configured to maintain a given distance between adjacent display units when mounted thereto. Hence, the process of aligning individual display units in a tiled display system can be obviated. Furthermore, a first technician can begin the alignment process of adjusting the profile of the display locating component independently of a second technician mounting display units thereto in areas of the display locating component that have already been adjusted. Hence, the alignment and display unit installation processes can proceed concurrently.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the present specification provides a system for mounting a plurality of display units, which system comprises a display locating component that is substantially two-dimensional. The display locating component defines a surface having a profile, and the display locating component has a plurality of mounting positions each at a predetermined position on the display locating component, each mounting position configured to receive at least one of the display units. The system also comprises a plurality of adjustable mounts configured to: support the display locating component, and adjust the profile of the display locating component to within a given profile tolerance.

The display locating component can comprise a sheet.

The profile can comprise one or more of a curved profile, a bent profile, and a faceted profile.

The profile can comprise a plane flat to within a given flatness tolerance.

The display locating component can comprise a plurality of portions each defining a corresponding surface having a corresponding profile. A corresponding subset of the plurality of adjustable mounts can be configured to: support each corresponding portion, and to adjust each corresponding profile to within a corresponding given profile tolerance independently of other portions.

The plurality of adjustable mounts can be further configured to adjust the profile such that viewing surfaces of adjacent display units are flush with one another in a normal-to-surface direction when the display units are secured to the display locating component at their respective mounting positions.

Each adjustable mount can comprise: a first end securable to the display locating component, and a second end securable to a load bearing structure. A distance between the first end and the second end can be adjustable to allow for adjusting the profile of the display locating component to within the given profile tolerance.

The display locating component can comprise a corresponding attachment site for each of the plurality of adjustable mounts, each corresponding attachment site can be larger than the corresponding first end to provide a clearance between the first end and the attachment site in in-surface directions before the first end is secured to the display locating component at the attachment site.

At least one of the adjustable mounts can comprise: a member terminating in the first end, and a clamp terminating in the second end. The clamp can be configured to reversibly clamp the member at a plurality of positions along a length of the member to adjust the distance between the first end and the second end.

The clamp can comprise one or more of a screw clamp and a toggle clamp.

One or more of the mounting positions can comprise a cut-out shaped and sized to receive at least a portion of the corresponding display unit.

One or more of the mounting positions can comprise one or more fastener receiving sites configured to receive one or more fasteners configured to secure the corresponding display unit to the display locating component.

The predetermined positions of the mounting positions can be selected such that the display units received at the mounting positions will be aligned with each other to within a given inter-display unit tolerance.

A number of the plurality of adjustable mounts and their corresponding attachment positions to the display locating component can be selected such that the display locating component maintains its profile within the given profile tolerance when the display units are secured to their corresponding mounting positions.

The system can further comprise one or more removable projections extending from the display locating component in an out-of-surface direction, the projections configured to intersect light from a laser leveling tool.

One or more of the projections can comprise a cylindrical component having one or more marks along its outer circumference, the marks defining a plane parallel to an end of the cylindrical component.

One or more of the projections can comprise a magnetic material configured to removably secure the projection to the display locating component.

The system can further comprise a further display locating component having a plurality of respective mounting positions each at a respective predetermined position on the further display locating component, each mounting position configured to receive at least one of the display units. The display locating component and the further display locating component can each have respective inter-component attachment sites at respective predetermined positions on each display locating component. The system can further comprise one or more cross-ties securable to the display locating component and the further display locating component at the respective inter-component attachment sites for each display locating component. The cross-ties can be configured to secure the further display locating component to the display locating component at a predetermined alignment between the display locating component and the further display locating component.

The predetermined alignment between the display locating component and the further display locating component can be in in-surface directions.

The surface defined by the display locating component can be oriented at an angle greater than 0° and less than 180° with a further surface defined by the further display locating component.

BRIEF DESCRIPTION OF THE DRAWINGS

Some implementations of the present specification will now be described, by way of example only, with reference to the attached Figures, wherein.

DETAILED DESCRIPTION

Figure 1:
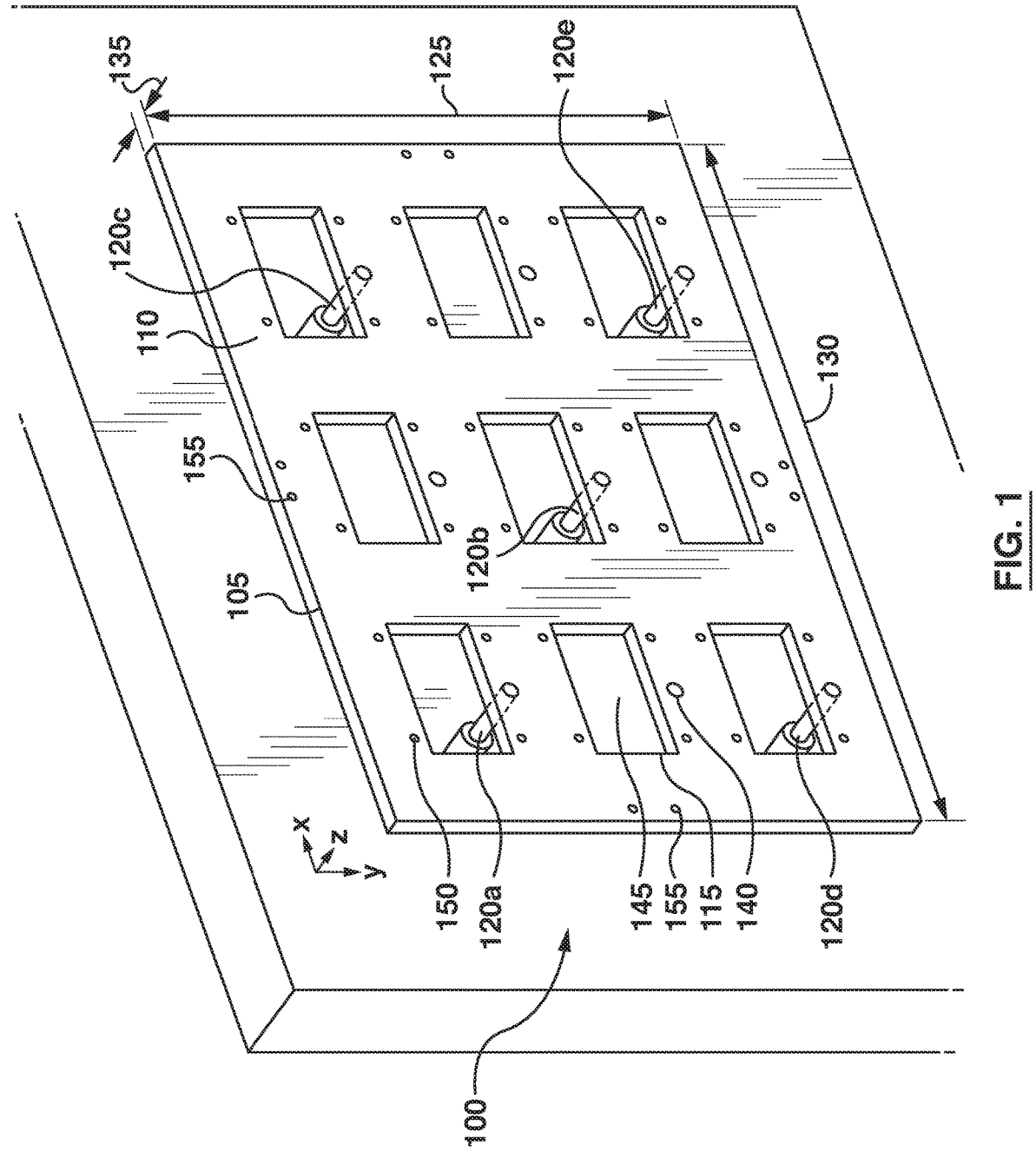
FIG. 1 shows a top perspective view of a system for mounting a plurality of display units, according to non-limiting implementations.

To address the challenges in the installation and alignment of tiled display systems, there is provided a system 100 for mounting a plurality of display units, as shown in FIG. 1, which includes xyz Cartesian indicators to generally indicate direction, for clarity. System 100 comprises a display locating component 105 which is substantially two-dimensional and defines a surface 110 having a profile. Display locating component 105 has a plurality of mounting positions 115 each at a predetermined position on display locating component 105. Each mounting position 115 is configured to receive at least one of the display units. System 100 also comprises a plurality of adjustable mounts 120a, 120b, 120c, 120d, and 120e configured to: support display locating component 105, and adjust the profile of display locating component 105 to within a given profile tolerance.

Display locating component 105 is substantially two-dimensional, for example in the xy-directions. Display locating component 105 is substantially two-dimensional in the sense that two of its dimensions (e.g. in the x and y directions) are larger than the third dimension (e.g. in the z direction). A non-limiting example of such a substantially two-dimensional shape is a sheet. Such a substantially two-dimensional structure defines a surface 110 or a plane, which can have a profile including but not limited to a flat profile, a curved profile, a bent profile, and a faceted profile.

In addition, display locating component 105 is not completely rigid in the out-of-surface directions (e.g. in the z-direction as shown in FIG. 1) and has at least some flexibility in the out-of-surface directions. Display locating component 105 has a number of mounting positions 115 located at predetermined positions, each mounting position 115 configured to receive a respective display unit (not shown), including, but not limited to, a display tile.

System 100 also comprises a plurality of adjustable mounts 120a, 120b, 120c, 120d, and 120e, which will be interchangeably referred to hereafter, collectively, as adjustable mounts 120a-e, and generically as an adjustable mount 120. Adjustable mounts 120a-e can be used to secure display locating component 105 to a load bearing support including but not limited to a wall and/or a frame. In addition, adjustable mounts 120a-e have an adjustable length, for example in the z-direction as shown in FIG. 1. By adjusting the length of adjustable mounts 120a-e, display locating component 105 can be deformed in the out-of-surface direction and hence its profile can be adjusted.

System 100 can hence enable using one display locating component 105 to install a large number of display units. Display locating component 105 need not be a heavy, rigid component, but can be lighter and somewhat flexible allowing for the final profile of display locating component 105 to be adjusted and finalized during the installation process by adjusting adjustable mounts 120a-e.

Mounting positions 115 can be positioned across display locating component 105 at predetermined positions in-surface (i.e. in the xy plane as shown in FIG. 1). The positions of mounting positions 115 in turn determine the position of the corresponding display units that are received at each mounting position 115, also in-surface. In other words, the positioning of mounting positions 115 in-surface also determines and fixes the alignment of display units received at those mounting positions 115 with respect to their neighboring display units, also in-surface. By selecting the positions of mounting positions 115, the display units received at those positions can be aligned with one another to within a given inter-display unit tolerance. This can obviate the need for in-surface or xy alignment of the display units with one another during the installation process. In some implementations, the inter-display unit tolerance can be within about ±1 cm. In other implementations, the inter-display unit tolerance can be within about ±0.5 cm. In yet other implementations, the inter-display unit tolerance can be within about ±0.2 cm. In yet other implementations, the inter-display unit tolerance can be within about ±0.01 cm.

In addition, by adjusting a relatively smaller number of adjustable mounts 120a-e, as compared to when individual mounts are adjusted in the prior art, a relatively larger number of display units can be aligned in the out-of-surface direction, which would include the z-direction in the example of FIG. 1. For example, display locating component 105 in FIG. 1 can receive nine display units, one at each mounting position 115. (In FIG. 1, for clarity only one of the nine mounting positions 115 is labeled as such.) However, adjusting the five, or potentially even fewer of, adjustable mounts 120a-e can adjust the profile of display locating component 105, for example by ensuring that display locating component 105 is flat to within a given flatness tolerance. This would in turn ensure that display units received at mounting positions 115 would be aligned with one another in an out-of-surface direction (i.e. shown in FIG. 1 as the z-direction) as well to within the given profile tolerance, and can obviate the need to adjust each display unit individually in the out-of-surface direction.

Moreover, system 100 can be installed and have its profile adjusted and finalized during the construction phase of a space that is to house the tiled display system, without the need for exposing sensitive and expensive display units to potential damage during the construction phase. Once the construction is finished, display units can be secured and/or mounted to display locating component 105 at their respective mounting positions 115 without the need for any further alignment, individually or collectively, of the display units.

As shown in FIG. 1, display locating component 105 can have a first dimension 125 (e.g. in the y-direction), a second dimension 130 (e.g. in the x-direction) and a third dimension 135 (e.g. in the z-direction). First dimension 125 and second dimension 130 can be in-surface in the sense that they lie on surface 110 defined by display locating component 105. In the example of FIG. 1, surface 110 would be in a xy plane. Third dimension 135 can be normal-to-surface, which in the example of FIG. 1 is the z-direction.

In some implementations, first dimension 125 can be a straight line. In some implementations the smaller of first dimension 125 and second dimension 130 can be at least about fifty times larger than third dimension 135. In other implementations the smaller of first dimension 125 and second dimension 130 can be at least about one hundred and fifty times larger than third dimension 135. In some implementations, third dimension 135 can be smaller than about 5 cm. In other implementations, third dimension 135 can be smaller than about 2.5 cm. In yet other implementations, third dimension 135 can be smaller than about 0.3 cm.

In some implementations, display locating component 105 can be dimensioned to support at least a 2×1 or 1×2 array of display units. In other implementations, display locating component 105 can be dimensioned to support arrays of display units that are larger than 2×1 or 1×2. In yet other implementations, display locating component 105 can be dimensioned to support irregularly-shaped arrays of two or more display units.

Display locating component 105 can also comprise attachment sites 140 for attaching display locating component 105 to one of adjustable mounts 120a-e. Although FIG. 1 shows nine attachment sites 140, one for each mounting position 115, for clarity only one of the attachment sites 140 is labeled as such. It is contemplated that display locating component 105 can have any number of attachment sites 140 which can be distributed in different configurations and at different locations on display locating component 105. Display locating component 105 can have more, the same number, or fewer attachment sites 140 than it has mounting positions 115. When system 100 is assembled, some attachment sites 140 may be attached to adjustable mounts 120a-e, while other attachment sites 140 may remain unused. Each attachment site 140 can comprise a respective aperture in display locating component 105.

Display locating component 105 can also have any number and arrangement of mounting positions 115. In some implementations, mounting positions 115 can comprise apertures or cut-outs 145 shaped and sized to receive at least a portion of the corresponding display unit. In other implementations, mounting positions 115 can each have one or more fastener receiving sites 150 configured to receive one or more fasteners configured to secure the corresponding display unit to display locating component 105. These fasteners can include, but are not limited to, screws, bolts, magnets, snap-fittings, and the like. In turn, fastener receiving sites 150 can include, but are not limited to, apertures, threaded screw holes, and the like. In some implementations, mounting positions 115 can have both cut-outs 145 and fastener receiving sites 150.

It is contemplated that display locating component 105 can have any number or arrangement of cut-outs 145 and/or fastener receiving sites 150 per mounting position 115. Display units receivable at mounting positions 115 can comprise, but are not limited to, LED displays, LCD displays, plasma displays, front and/or rear projection displays, and the like. Indeed, any type of display unit which can be used in tiled display systems is within the scope of the present specification.

Display locating component 105 can also have one or more inter-component attachment sites 155 for securing display locating component 105 to an adjacent display locating component, as described in further detail below. This would allow for scaling up and expanding the size of the tiled display system without having to fabricate and transport prohibitively large and/or heavy display locating components.

Figure 2:
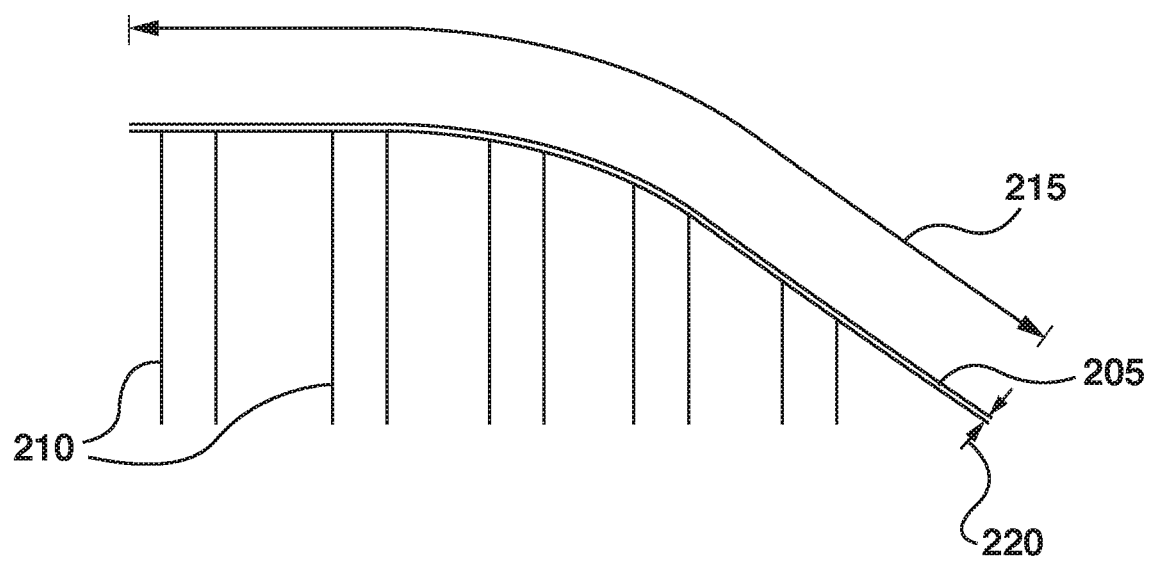
FIG. 2 shows a top plan view of another implementation of the system for mounting a plurality of display units, according to non-limiting implementations.
Figure 3:
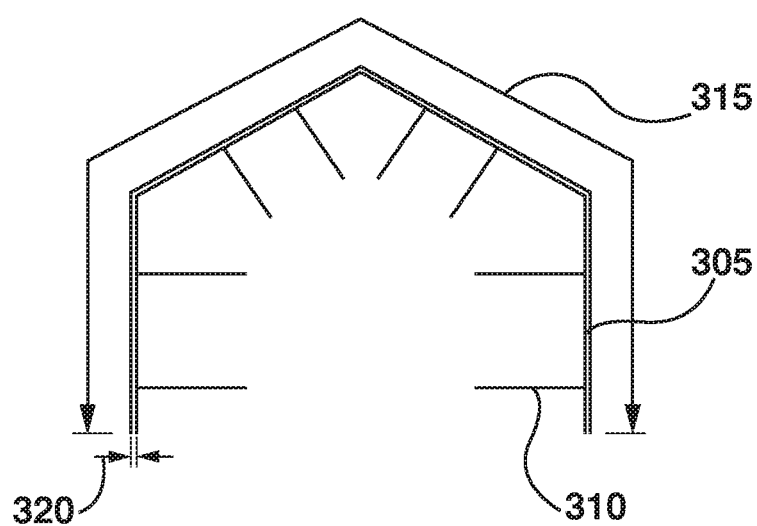
FIG. 3 shows a top plan view of yet another implementation of the system for mounting a plurality of display units, according to non-limiting implementations.

As shown in FIGS. 2 and 3, the display locating component need not be a flat sheet. FIG. 2 shows a top view of a curved display locating component 205 supported by adjustable mounts 210. Display locating component 205 includes a second dimension 215 that is much larger than a smaller third dimension 220. FIG. 3 shows a bent or faceted display locating component 305 supported by adjustable mounts 310. Display locating component 305 has a second dimension 315 that is much larger than a much smaller third dimension 320.

Figure 4:
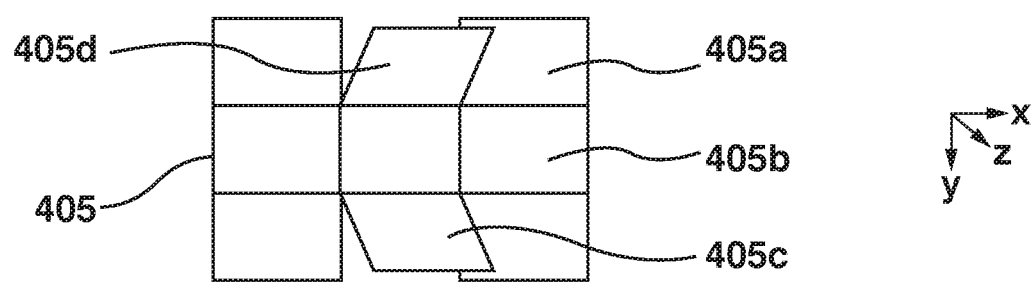
FIG. 4 shows a side view of yet another implementation of the system for mounting a plurality of display units, according to non-limiting implementations.

FIG. 4 shows a display locating component 405 having multiple portions such as portions 405a, 405b, 405c, and 405d, which will be interchangeably referred to hereafter, collectively, as portions 405a-d. FIG. 4 also includes xyz Cartesian indicators to generally indicate direction, for clarity. Each one of portions 405a-d defines a corresponding surface having its own corresponding profile. Each one of portions 405a-d can define a facet of display locating component 405. While not visible in FIG. 4, each one of portions 405a-d can have its own dedicated subset of adjustable mounts to support each of portions 405a-d and to adjust the profile of each of portions 405a-d to within a corresponding profile tolerance independently of the adjustment of other portions 405a-d. In some implementations, at least some of the portions 405a-d can be coplanar or lie on parallel planes. For example, as shown in the example of FIG. 4, portions 405a and 405b are coplanar. In some implementations, at least some of the portions 405a-d can be at an angle greater than 0° and less than 180° to one or more of the other portions. For example, as shown in FIG. 4, portion 405d is at about a 45° angle to adjacent portion 405a.

Profile tolerance, and flatness tolerance as referred to herein with respect to flat display locating components, can comprise a level of out-of-surface deviation from the given profile that would not be detectable by a human visual system of average acuity in the final tiled display system when the display units/tiles are mounted on the display locating device and are used to display a still or moving image. In some implementations, the profile tolerance can be within about ±2 cm. In other implementations, the profile tolerance can be within about ±0.5 cm. In yet other implementations, the profile tolerance can be within about ±0.2 cm. In yet other implementations, the profile tolerance can be within about ±0.01 cm. In general, however, such tolerances can be predetermined for a given tiled display system.

Figure 5:
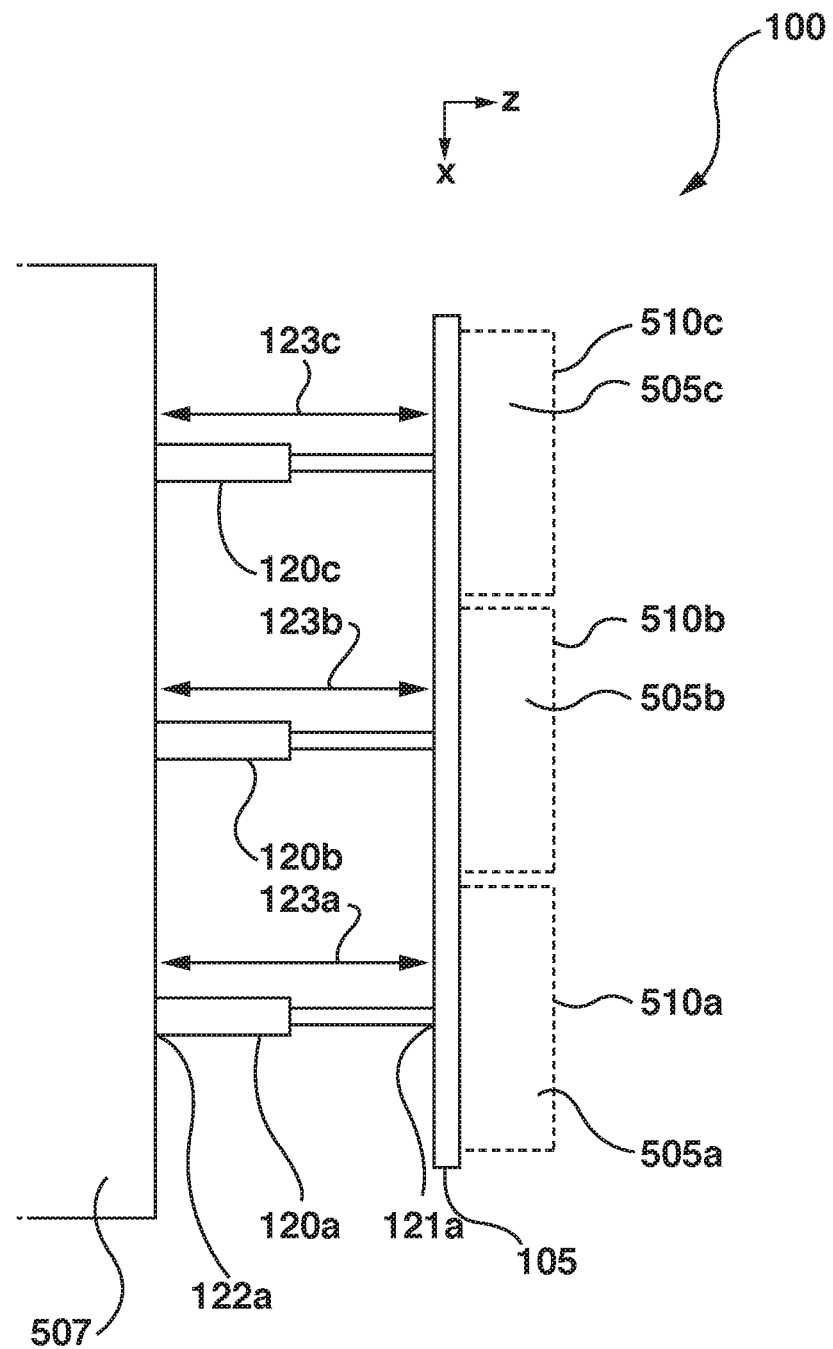
FIG. 5 shows a top plan view of the system of FIG. 1, according to non-limiting implementations.

FIG. 5 shows a top view of system 100 secured to a load bearing structure, which for example can be wall 507. FIG. 5 also includes x and z Cartesian indicators to generally indicate direction, for clarity. Adjustable mounts 120a, 120b, and 120c are visible, and it is assumed that the remaining adjustable mounts 120 are present, but not visible. Adjustable mount 120a can have a first end 121a that is generally securable, and is shown as being secured, to display locating component 105. Adjustable mount 120a can have a second end 122a that is generally securable, and is shown as being secured, to a load bearing structure, which is wall 507 in this example. The other adjustable mounts, including adjustable mounts 120b and 120c also have similar respective first and second ends. Distance 123a between first end 121a and second end 122a is adjustable. The same is true of corresponding distances for the other adjustable mounts, including distances 123b and 123c for adjustable mounts 120b and 120c respectively.

By adjusting each of distances 123a-c, and similar distances for the other adjustable mounts, profile of display locating component 105 can be adjusted. For example, profile of display locating component 105 can be adjusted to be flat within a given flatness tolerance. Display units 505a, 505b, and 505-c, hereinafter referred to collectively as 505a-c, also are shown in dashed lines to indicate where those display units would be attached to display locating component 105 after adjustment of the profile is completed. Display units 505a-c have viewing surfaces 510a, 510b, and 510-c respectively, which are hereinafter referred to collectively as 510a-c. Profile of display locating component 105 can be adjusted such that viewing surfaces 510a-c of adjacent display units 505a-c are flush with one another in a normal-to-surface direction (in this example the z-direction) when display units 505a-c are secured to display locating component 105 at their respective mounting positions.

Figure 6:
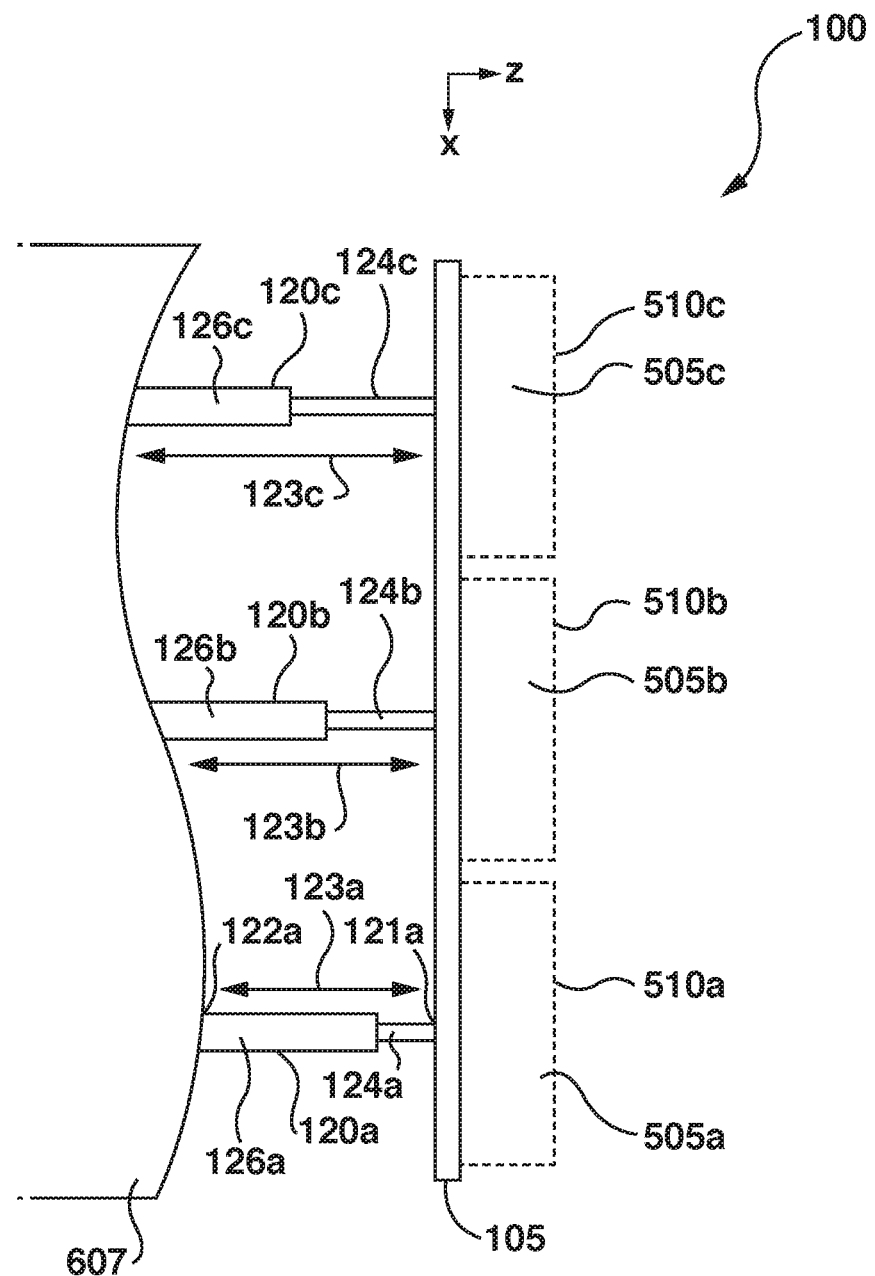
FIG. 6 shows a top plan view of the system of FIG. 1, according to non-limiting implementations.

FIG. 6 shows a top view of system 100 secured to a different load bearing structure 607. FIG. 6 also includes x and z Cartesian indicators to generally indicate direction, for clarity. FIG. 6 is similar to FIG. 5, with like elements having like numbers, however FIG. 6 includes a load bearing structure 607 that is not flat, in contrast to wall 507. By independently adjusting distances 123a-c of adjustable mounts 120a-c, and those of the other adjustable mounts not visible in FIG. 6, display locating component 105 can be adjusted to have a flat profile even though it is secured to a non-flat load bearing structure 607.

Adjustable mount 120a can have a member 124a terminating in first end 121a and a clamp 126a terminating in second end 122a. Clamp 126a can be configured to reversibly clamp member 124a at different positions along a length of member 124a to adjust distance 123a between first end 121a and second end 122a. Clamp 126a can be, but is not limited to, a screw clamp, a toggle clamp, and the like. The same clamp-and-member structure can be used in other adjustable mounts. For example, adjustable mount 120b can have member 124b clamped by clamp 126b and adjustable mount 120c can have member 124c clamped by clamp 126c. By adjusting where each clamp attaches to or clamps its corresponding member, and thereby adjusting the distance between the first and second ends corresponding to that adjustable member, profile of display locating component 105 can be adjusted and maintained within a given profile tolerance despite unevenness in the load bearing structure 607 to which system 100 is attached.

Figure 7:
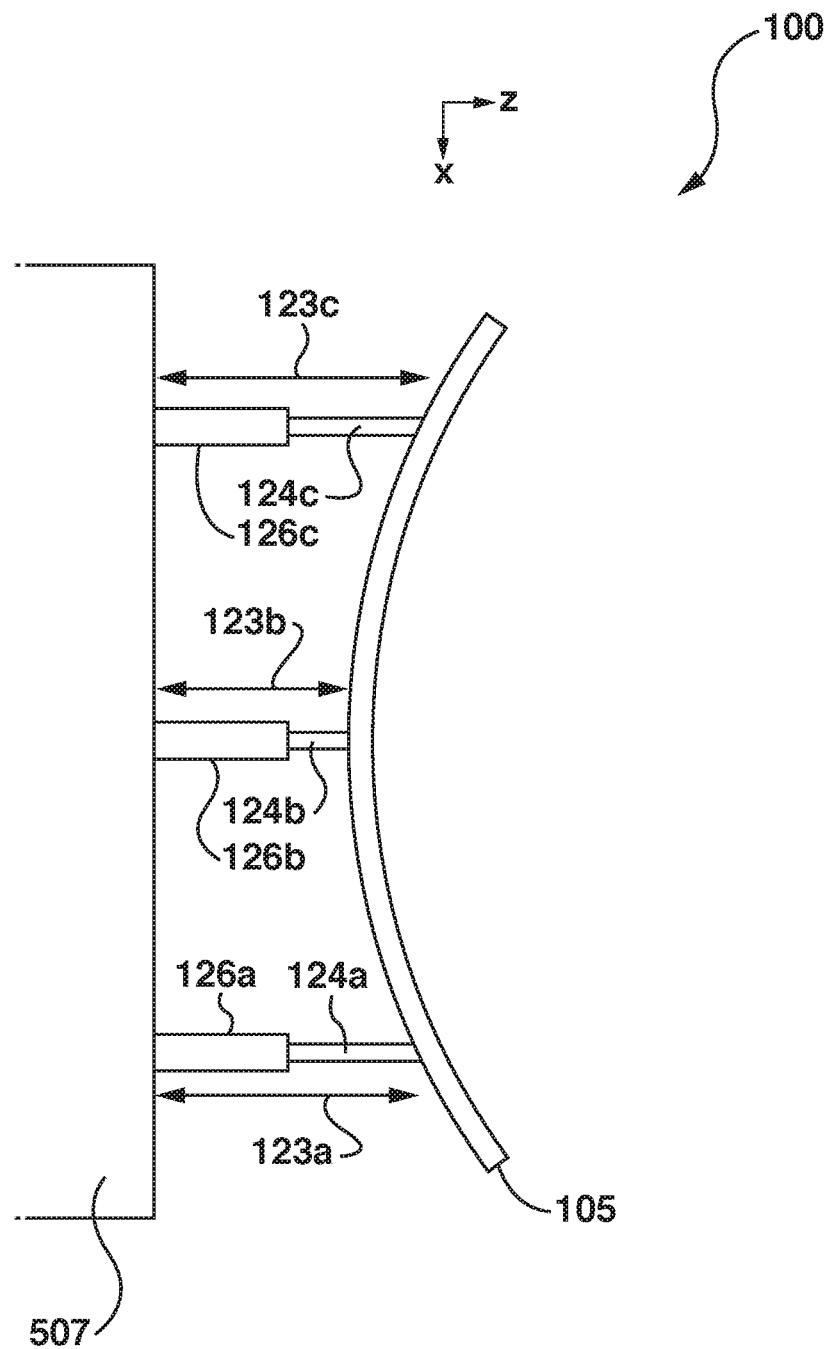
FIG. 7 shows a top plan view of the system of FIG. 1, according to non-limiting implementations.

FIG. 7 shows a top view of system 100 secured to wall 507. FIG. 7 also includes x and z Cartesian indicators to generally indicate direction, for clarity. FIG. 7 is similar to FIG. 5, with like elements having like numbers, however in FIG. 7 the profile of display locating component 105 is curved in contrast to the flat profile of display locating component 105 in FIG. 5. By adjusting distances corresponding to the adjustable mounts, including distances 123*a-c*, profile of display locating component 105 can be adjusted to be curved, even though display locating component 105 is secured to wall 507 which is flat. While FIG. 7 shows the profile curved in only the xz plane, it is contemplated that adjustable mounts can be used to adjust and/or curve the profile in one or more of the yz, xz, xy planes.

In some implementations, adjustable mounts 120*a-e* can be used to support display locating component 105 in an upright or generally vertical orientation. In some implementations, an upright orientation can be within about 30° of vertical. In some implementations, adjustable mounts 120*a-e* can be configured to be oriented on a generally horizontal plane when adjustable mounts 120*a-e* are securing the display locating component 105 to a load bearing structure in order to support display locating component 105 in a generally vertical orientation. In some implementations, a generally horizontal plane can be within about 30° of horizontal. In some implementations system 100 can be configured to be secured to and supported by a load bearing structure, for example a wall, which can be generally vertical. In other implementations, the load bearing structure can be within about 30° of vertical.

It is contemplated that adjustable mounts can comprise any adjustable support mechanism which can adjustably and reversibly change its size in at least one dimension, is securable to both the display locating component and a load bearing structure, and can support the weight of the displaying locating component and the displays that can be attached to it. In some implementations, adjustable mounts can be, but are not limited to, one of a member-and-clamp mechanism, a scissor jack, a screw jack, a piezoelectric actuator, and an electrical actuator comprising stepper motors.

Figure 8:
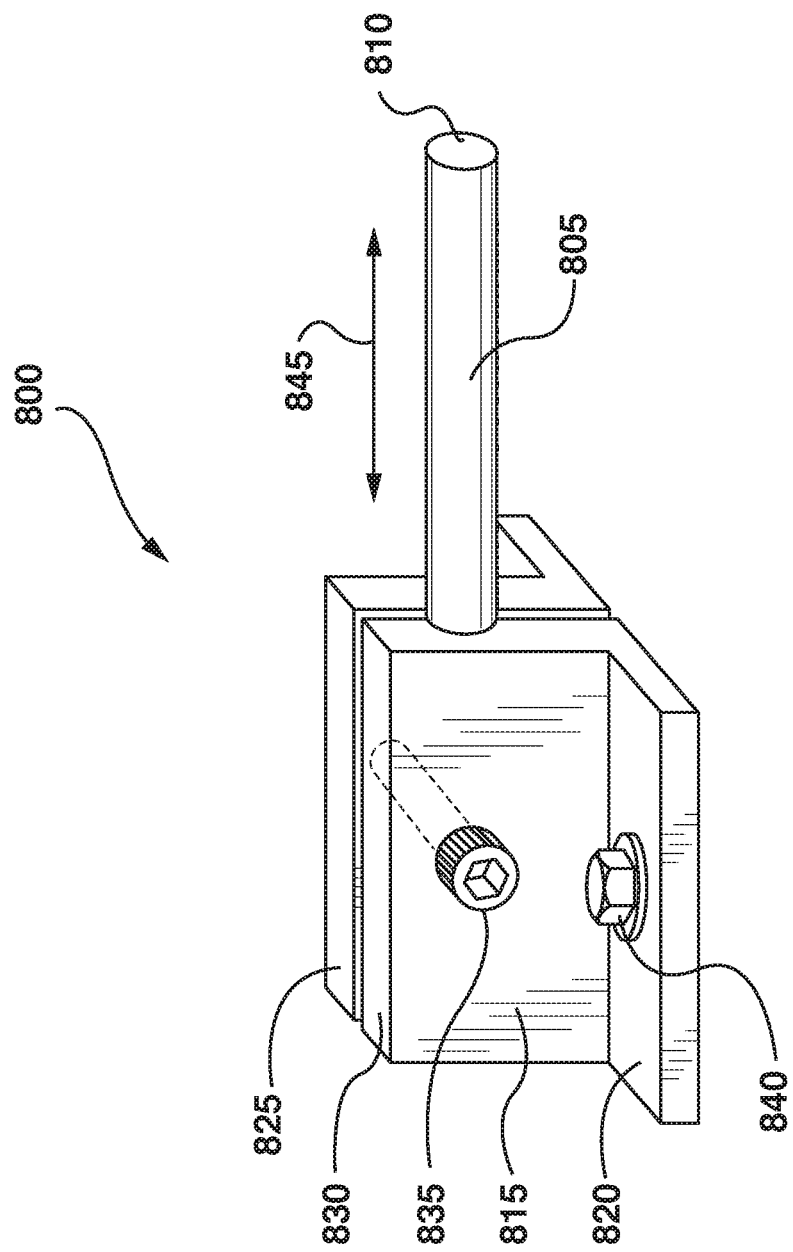
FIG. 8 shows a stop perspective view of a clamp-and-member adjustable mount, according to non-limiting implementations.

FIG. 8 shows an example member-and-clamp mechanism 800 which can be used to implement the adjustable mounts. Member-and-clamp mechanism 800 comprises an elongated member 805 which can be adjustably and reversibly received and clamped in clamp 815. Member 805 terminates in first end 810 which can attach to a display locating component. Clamp 815 comprises clamp jaws 825,830 which receive member 805 between them. Clamp jaws 825,830 can comprise grooves having a shape complementary to the shape of member 805 to receive member 805. For example, as shown in FIG. 8, when member 805 is cylindrical, clamp jaws 825,830 can each have approximately semi-cylindrical grooves to receive member 805. Clamp bolt 835 runs through clamp jaws 825,830 transversely to the length of member 805. Tightening bolt 835 forces clamp jaws 825,830 together, thereby squeezing and clamping member 805. In some implementations, not shown in the drawings, the clamp can comprise a keyless chuck system to clamp member 805.

Clamp 815 terminates in second end 820, which can be securable to a load bearing structure, for example using attachment bolt 840. To adjust the distance between first end 810 and second end 820, clamp bolt 835 is loosened, member 805 is adjusted towards or away from clamp 815 along directions 845, and then clamp bolt 835 is tightened to clamp member 805 in the new position.

When installing system 100, as shown in FIGS. 1 and 5-7, adjustable mounts 120*a-e* can be secured to the load bearing structure first, and then display locating component 105 can be secured to adjustable mounts 120*a-e*. Attachment sites 140 can be pre-positioned on display locating component 105. Ensuring that adjustable mounts 120*a-e*, already secured to the load bearing structure, line up with attachment sites 140 can require precise location and mounting of adjustable mounts 120*a-e*.

Figure 9:
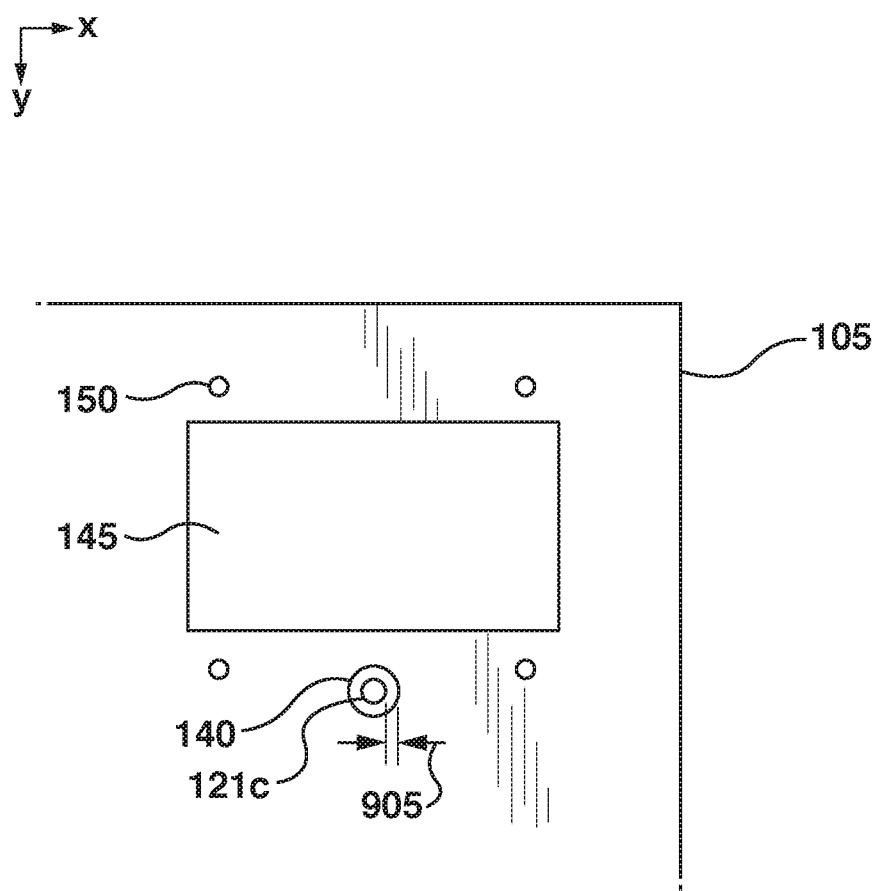
FIG. 9 shows a partial front elevation view of a portion of the display locating system of FIG. 1, according to non-limiting implementations.

To ease the requirement for precise positioning of adjustable mounts 120*a-e* on the load bearing structure, in some implementations, for example as shown in FIG. 9, attachment sites 140 can be larger than first end 121*c* of the corresponding adjustable mount that is to be secured to display locating component 105 at attachment site 140. This difference in size provides a clearance 905 that allows the positioning of adjustable mounts 120*a-e* in the in-surface (or the xy plane in FIG. 9) directions on the load bearing structure to be coarser than the precise in-surface positioning of attachment sites 140 on display locating component 105. FIG. 9 also includes x and y Cartesian indicators to generally indicate direction, for clarity.

After the first ends, for example first end 121*c* as shown in FIG. 9, are secured to display locating component 105, then the position of display locating component 105 becomes fixed relative to the first ends 121*a-e* of adjustable mounts 120*a-e*. First ends 121*a-e* can be secured to display locating component 105 at their respective attachment sites 140 using any suitable attachment means, including but not limited to using a nail, a threaded bolt, and threaded nut, a magnet, a palnut, and a pushnut.

For tiled display systems that comprise a large number of display tiles, or require arrangement of the display tiles in an irregular shape, using one single display locating component for the entire tiled display system may require the component to be prohibitively large or heavy. To address this challenge, multiple display locating components can themselves be tiled together and be supported by adjustable mounts in order to support the tiled display system.

Figure 10:
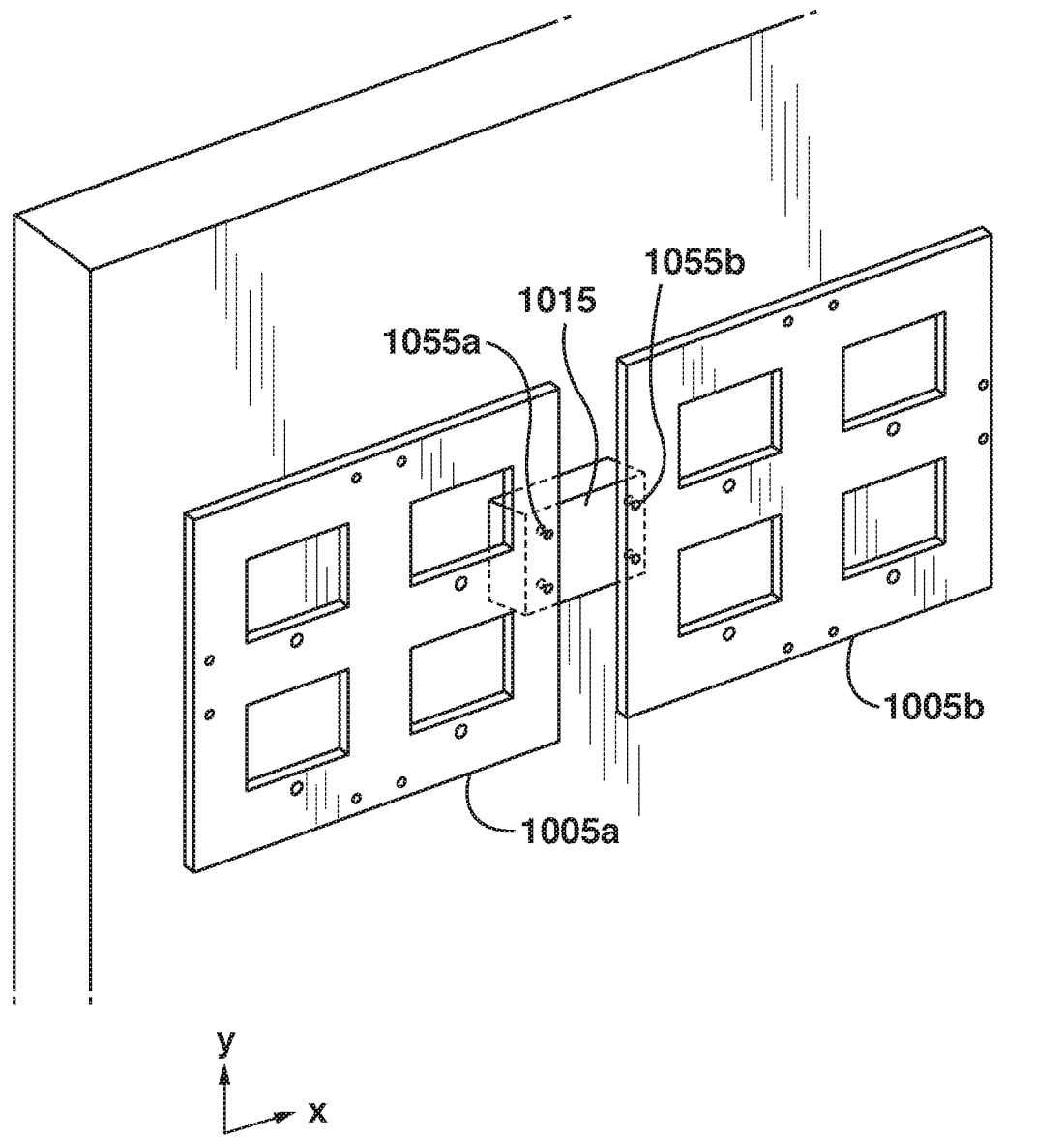
FIG. 10 shows a top perspective view of yet another implementation of the system for mounting a plurality of display units, according to non-limiting implementations.

Hence, attention is next directed to FIG. 10 which shows two display locating components 1005*a* and 1005*b* each having inter-component attachment sites 1055*a* and 1055*b* respectively. FIG. 10 also includes x and y Cartesian indicators to generally indicate direction, for clarity. Inter-component attachment sites 1055*a* and 1055*b* can comprise, but are not limited to bolt holes and/or threaded screw holes positioned at predetermined locations on each of display locating components 1005*a* and 1005*b*. A cross-tie 1015 can be used to secure display locating component 1005*a* to its adjacent display locating component 1005*b*.

Figure 11:
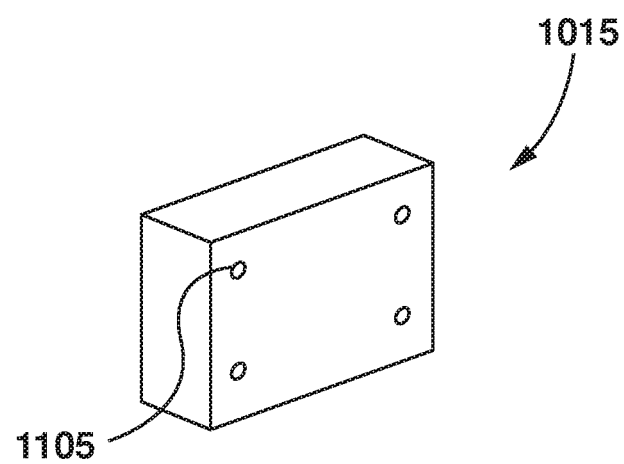
FIG. 11 shows a top perspective view of a cross-tie, according to non-limiting implementations.

As shown in FIG. 11, cross-tie 1015 can comprise a rigid component with predetermined cross-tie attachment sites 1105 located at predetermined locations on cross-tie 1015. These cross-tie attachment sites 1105 can comprise any suitable attachment site including, but not limited to, bolt holes and threaded screw holes. To secure display locating component 1005*a* to display locating component 1005*b* using cross-tie 1015, the corresponding inter-component attachment sites 1055*a* of display locating component 1005*a* are aligned with the corresponding cross-tie attachment sites 1105 of cross-tie 1015. Then display locating component 1005*a* is secured to cross-tie 1015 using a suitable attachment means including, but not limited to, bolts or screws. A similar process is repeated for attaching display locating component 1005*b* to cross-tie 1015.

As the positioning of inter-component attachment sites 1055*a,b* and cross-tie attachment sites 1105 effectively determines the alignment between display locating components 1005*a,b*, using cross-tie 1015 can eliminate the need for aligning the display locating components 1005*a,b* relative to each other in the in-surface (or xy in the example of FIG. 10) directions during the installation process. As shown in FIG. 10, cross-tie 1015 can be shaped and sized such that when display locating component 1005a is secured to an adjacent display locating component 1005b using the cross-tie, the surfaces defined by display locating components 1005a and 1005b respectively will be coplanar or oriented along parallel planes. In other implementations (not depicted in the Figs.), the cross-tie can be angled so that when display locating component 1005a is secured to an adjacent display locating component 1005b using the cross-tie, the surfaces defined by display locating components 1005a and 1005b respectively will be oriented at an angle greater than 0° and less than 180° with respect to one another.

Figure 12:
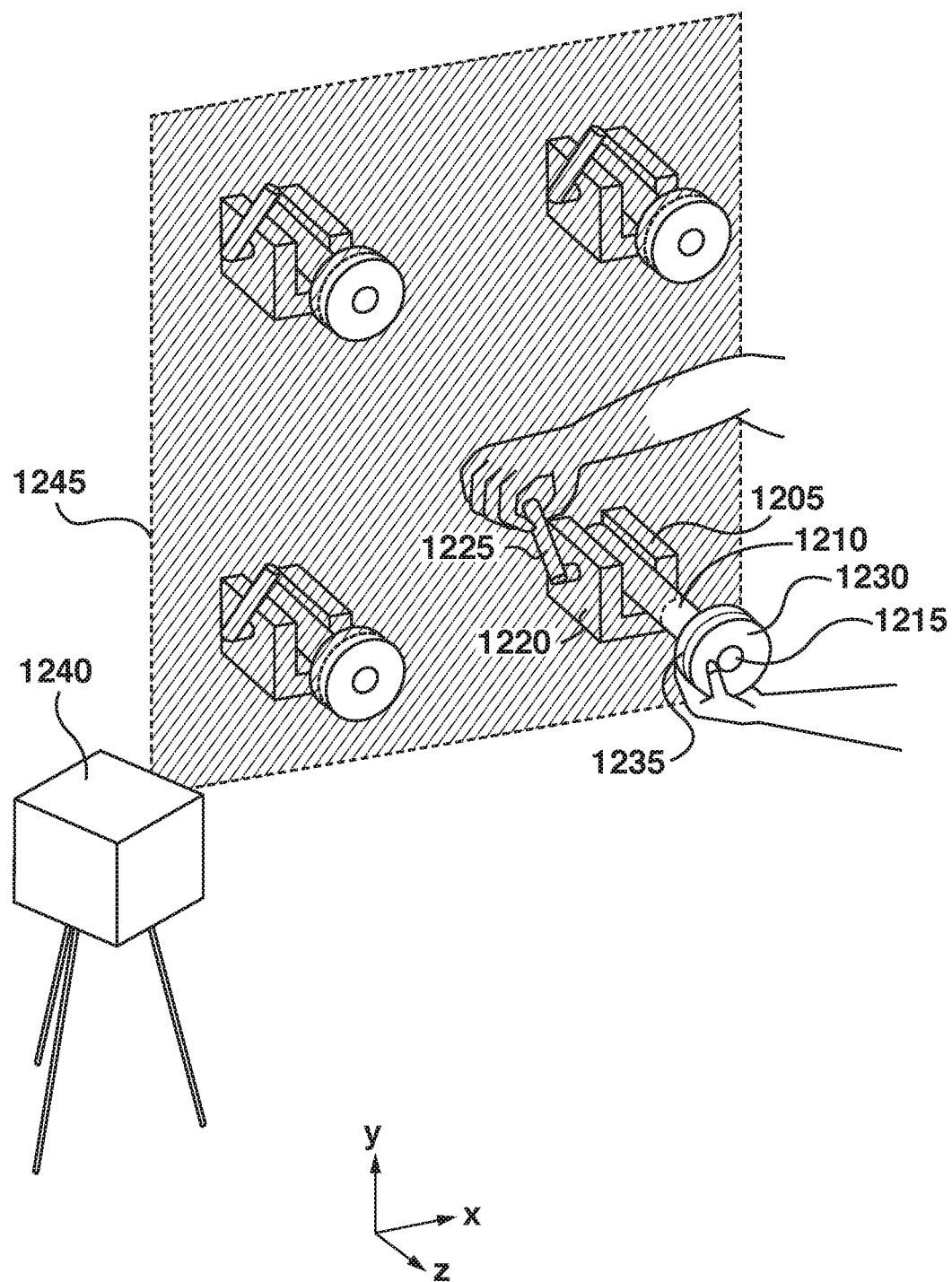
FIG. 12 shows a schematic view of a snapshot of the process of adjusting adjustable mounts using a laser leveling tool, according to non-limiting implementations.

FIG. 12 shows a schematic snapshot of an exemplary process for adjusting adjustable mounts 1205 in order to adjust the profile of the display locating component that is to be supported by those adjustable mounts. FIG. 12 also includes xyz Cartesian indicators to generally indicate direction, for clarity. Similar to member-and-clamp mechanism 800 shown in FIG. 8, adjustable mount 1205 comprises a member 1210 terminating in first end 1215. Member 1210 is received in clamp 1220 which is tightened and loosened using clamp screw 1225. A light interceptor 1230 is secured to first end 1215 and has a marking 1235 on its outer surface. Marking 1235 can be, but is not limited to, a fiducial. Marking 1235 can be printed, engraved, etched or otherwise indicated on the outer surface of light interceptor 1230.

A laser leveling tool 1240 emits laser light 1245 which can be intercepted by light interceptor 1230. In order to achieve a given alignment of adjustable mount 1205, adjustable mount 1205 is adjusted to align marking 1235 with the laser light intercepted by light interceptor 1230. This adjustment can be effected manually by loosening clamp screw 1225, adjusting member 1210 until marking 1235 is aligned with laser light 1245, and then tightening clamp 1220 using clamp screw 1225. The same process can be followed for each of the adjustable mounts.

Figure 13:
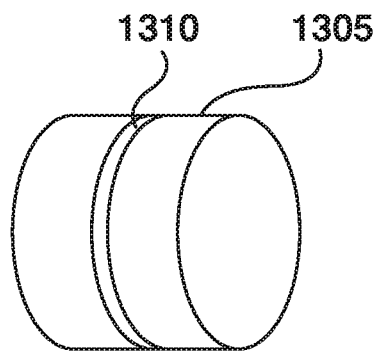
FIG. 13 shows a perspective view of a light interceptor, according to non-limiting implementations.

FIG. 13 shows an example light interceptor 1305 shaped as a cylindrical component having mark 1310 along its outer circumference. The cylindrical component can be partially or completely hollow. Mark 1310 defines a plane about parallel to an end of the cylinder forming light interceptor 1305. Light interceptor 1305 can comprise a magnetic material to allow it to removably attach to first end 1215 (shown in FIG. 12) or to a display locating component made of a magnet-attracting material.

Figure 14:
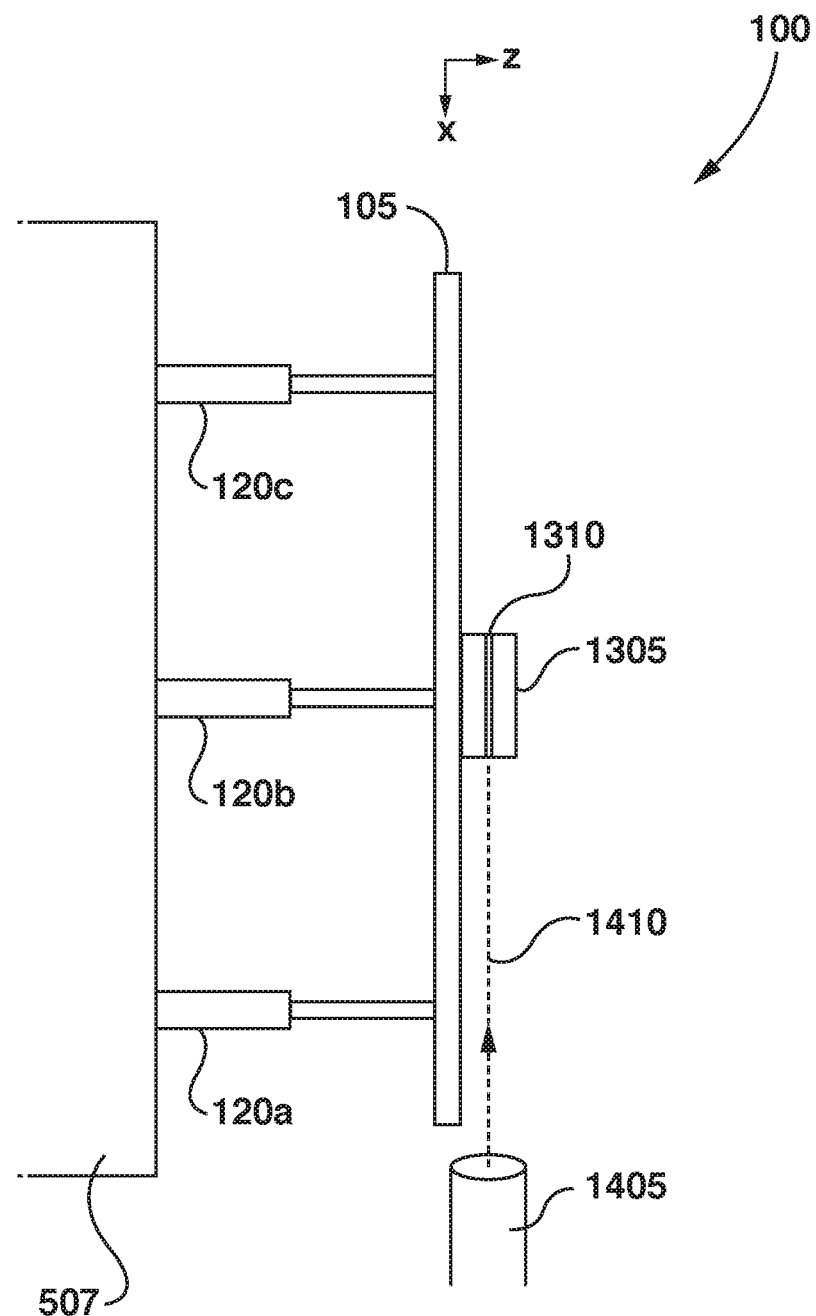
FIG. 14 shows a top plan view of the system of FIG. 1 during the laser-assisted profile adjustment process, according to non-limiting implementations.

FIG. 14 shows a top view of system 100 secured to wall 507 during an alternative process for adjusting the profile of display locating component 105 using a laser leveling tool 1405 emitting laser light 1410. FIG. 14 also includes x and z Cartesian indicators to generally indicate direction, for clarity. In the adjustment process depicted in FIG. 14, display locating component 105 is first secured to adjustable mounts 120a-e (only 120a-c are visible in FIG. 14), which are in turn secured to a load bearing structure such as wall 507. Then light interceptor 1305 is removably attached to display locating component 105 to intercept laser light 1410. Alternatively and/or in addition, one or more other removable projections extending from display locating component 105 in an out-of-surface direction can be used to intersect laser light 1410. A non-limiting example of an out-of-surface direction is the z-direction as shown in FIG. 14. These projections can also have marks for alignment with laser light 1410. Subsequently adjustable mounts 120a-e are adjusted to align mark 1310, or other similar marks on other removable projections as applicable, with laser light 1410, thereby adjusting the profile of display locating component 105.

The alignment process can be repeated by attaching light interceptor 1305 to different positions on display locating component 105. These positions can be all or a subset of attachment sites 140. In one implementation, the positions for attaching light interceptor 1305 can be the subset of attachment sites 140 where display locating component 105 is actually attached to adjustable mounts 120a-e. It is contemplated that light interceptors 1305 can be attached to display locating component 105 at a variety of different locations, which need not be limited to, or even include, attachment sites 140.

In yet other implementations, a first technician can begin the process of adjusting profile of the display locating component independently of a second technician mounting display units thereto in areas of the display locating component that have already been adjusted. In this manner, the profile adjustment and display unit installation processes can proceed concurrently.

In the implementations where adjusting the profile is completed before display units are secured to display locating component 105, system 100 should have mechanical properties such that attaching the display units does not alter the profile of display locating component 105, and consequently the alignment and profile of the display units themselves, beyond the profile tolerances. For example, display locating component 105 of system 100 should not bend, buckle, or twist under the torque exerted by the weight of a display unit to such as extent that its profile is deformed beyond a predetermined profile tolerance. To ensure that the profile remains within predetermined profile tolerances after display units are attached to display locating component 105, the number of adjustable mounts 120a-e and their corresponding attachment positions to display locating component 105 can be tailored and fine-tuned.

If display locating component 105 has low rigidity, e.g. due to thinness or softness of its constituent materials, and/or it must support a large number of heavy display units, then the number of adjustable mounts can be increased and their spacing can be decreased. For example, whereas FIG. 1 shows five adjustable mounts 120a-e at every second attachment site 140, in other implementations nine adjustable mounts at every attachment site 140 can be used to support heavier display units and/or accommodate a thinner and/or more flexible display locating component 105.

In some implementations, the distribution of the adjustable mounts may be non-uniform across the area/surface of display locating component 105 to accommodate non-uniform distribution of display units or display unit weight/size across the surface of display locating component 105. In such an arrangement, portions of the surface needing to resist more bending torque due to display units can be attached to and supported by a larger number of adjustable mounts (i.e. a larger number of adjustable mounts per unit area of display locating component 105) to increase the ability of the system to resist the bending torque and maintain its profile within the profile tolerances. It is contemplated that the density and positions of adjustable mounts can be tailored as needed to ensure the profile remains within profile tolerances after the display units are attached to display locating component 105.

The above-described implementations are intended to be exemplary and alterations and modifications may be effected thereto, by those of skill in the art, without departing from the scope of the invention which is defined solely by the claims appended hereto.

We claim:

1. A system for mounting a plurality of display units, the system comprising:
 a generally planar display locating component panel having a height that extends along a vertical direction and a width that extends along a horizontal direction that is perpendicular to the vertical direction, the display locating component panel having a plurality of cut-out openings therein each at a predetermined position on the display locating component panel, each cut-out opening configured to receive at least one of the display units therein, wherein the display locating component panel is a flexible metal sheet that is flexible in an out-of-surface direction that is perpendicular to both the vertical direction and the horizontal direction; and
 a plurality of telescopic adjustable mounts, wherein the adjustable mounts are configured to mount the display locating component panel to a support surface in a cantilevered manner,
 wherein each of the plurality of adjustable mounts comprises a first end securable to a rear of the display locating component panel, and
 a second end securable to the support surface, wherein a distance between the first end and the second end is adjustable, wherein
 the adjustable mounts are configured to deform the display locating component panel in the out-of-surface direction to adjust the display locating component panel in the out-of-surface direction, such that when the display units are mounted within the cut-out openings of the display locating component panel respective viewing surfaces of the display units are aligned in the out-of-surface direction and adjust the display locating component panel to have a flat profile when the support surface is a non-flat surface upon which the second end of each adjustable mount is configured to be directly secured.

2. The system of claim 1, wherein the adjustable mounts each adjust independently of each other
 to adjust corresponding portions of the display locating component panel.

3. The system of claim 1, wherein, when in use, the display units are parallel to each other when the display units are stored within the cut-out openings.

4. The system of claim 1, wherein the display locating component panel comprises a corresponding attachment site for each of the plurality of adjustable mounts, each corresponding attachment site being larger than a corresponding first end of each adjustable mount respectively to provide a clearance between each corresponding first end and each corresponding attachment site respectively before each corresponding first end is secured to the display locating component panel at each corresponding attachment site respectively.

5. The system of claim 1, wherein the display locating component panel comprises fastener receiving sites therein, wherein the fastener receiving sites are configured to receive fasteners to secure a corresponding display unit from the display units to the display locating component panel.

* * * * *